US011330532B2

(12) United States Patent
Wu et al.

(10) Patent No.: US 11,330,532 B2
(45) Date of Patent: May 10, 2022

(54) POWER CONTROL METHOD AND APPARATUS AND COMMUNICATION SYSTEM

(71) Applicant: FUJITSU LIMITED, Kawasaki (JP)

(72) Inventors: Lianhai Wu, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/299,705

(22) Filed: Mar. 12, 2019

(65) Prior Publication Data

US 2019/0208476 A1    Jul. 4, 2019

(51) Int. Cl.
*H04W 52/24* (2009.01)
*H04W 4/02* (2018.01)
*H04W 52/38* (2009.01)

(52) U.S. Cl.
CPC ......... *H04W 52/247* (2013.01); *H04W 4/023* (2013.01); *H04W 52/383* (2013.01); *H04W 52/242* (2013.01)

(58) Field of Classification Search
CPC .................................................. H04W 52/247
See application file for complete search history.

(56) References Cited

U.S. PATENT DOCUMENTS

| | | | |
|---|---|---|---|
| 10,412,692 B2* | 9/2019 | Siomina | H04W 76/14 |
| 2012/0243431 A1 | 9/2012 | Chen et al. | |
| 2013/0116002 A1* | 5/2013 | Kim | H04W 52/04 |
| | | | 455/522 |
| 2013/0272262 A1* | 10/2013 | Li | H04L 5/0001 |
| | | | 370/330 |
| 2014/0198694 A1 | 7/2014 | Yang et al. | |
| 2014/0233476 A1 | 8/2014 | Kwak et al. | |
| 2015/0139111 A1 | 5/2015 | Fodor et al. | |

(Continued)

FOREIGN PATENT DOCUMENTS

| | | |
|---|---|---|
| CN | 102792745 A | 11/2012 |
| CN | 102958066 A | 3/2013 |

(Continued)

OTHER PUBLICATIONS

International Search Report issued by State Intellectual Property Office of the P.R. China for corresponding International Patent Application No. PCT/CN2016/099877, dated Jun. 6, 2017, with an English translation.

(Continued)

*Primary Examiner* — John D Blanton
(74) *Attorney, Agent, or Firm* — Myers Wolin, LLC (57) ABSTRACT

A power control method and apparatus and a communication system. The method includes: a terminal acquires transmission power assistant information when transmission of sidelink information is triggered; and the terminal determines transmission power of the sidelink information according to the transmission power assistant information. With the embodiments of this disclosure, by using a characteristic that an application stratum of the terminal is able to learn a distance between a receiver end and a transmitter end according to a positioning system and/or a map, information related on power setting is provided to an access stratum of the terminal, so as to instruct the terminal or an eNB to set appropriate transmission power.

2 Claims, 7 Drawing Sheets

(56) References Cited

U.S. PATENT DOCUMENTS

| | | | | |
|---|---|---|---|---|
| 2015/0195791 A1* | 7/2015 | Jiang | ............... | H04W 52/243 |
| | | | | 455/522 |
| 2015/0296443 A1* | 10/2015 | Lim | ............... | H04W 8/005 |
| | | | | 370/312 |
| 2015/0327189 A1 | 11/2015 | Seo et al. | | |
| 2016/0007304 A1* | 1/2016 | Morita | ............... | H04W 52/0209 |
| | | | | 370/311 |
| 2016/0037570 A1* | 2/2016 | Guo | ............... | H04W 12/06 |
| | | | | 455/404.1 |
| 2016/0330696 A1 | 11/2016 | Suzuki et al. | | |
| 2017/0367056 A1 | 12/2017 | Wei | | |
| 2018/0220302 A1* | 8/2018 | Chen | ............... | H04W 48/16 |
| 2019/0028978 A1* | 1/2019 | Yasukawa | ............... | H04W 4/70 |
| 2019/0104486 A1* | 4/2019 | Wei | ............... | H04W 52/383 |

FOREIGN PATENT DOCUMENTS

| | | |
|---|---|---|
| CN | 104904279 A | 9/2015 |
| CN | 105027639 A | 11/2015 |
| CN | 105379367 A | 3/2016 |
| CN | 105722200 A | 6/2016 |
| CN | 105874854 A | 8/2016 |
| WO | 2014/116020 A1 | 7/2014 |
| WO | 2016/022065 A1 | 2/2016 |

OTHER PUBLICATIONS

Written Opinion of the International Searching Authority issued by State Intellectual Property Office of the P.R. China for corresponding International Patent Application No. PCT/CN2016/099877, dated Jun. 6, 2017, with an English translation.

3GPP TS 36.213 V9.2.0, "3rd Generation Partnership Project; Technical Specification Group Radio Access Network; Evolved Universal Terrestrial Radio Access (E-UTRA); Physical layer procedures (Release 9)", Jun. 2010.

ETSI TS 136 101 V14.3.0, "LTE; Evolved Universal Terrestrial Radio Access (E-UTRA); User Equipment (UE) radio transmission and reception (3GPP TS 36.101 version 14.3.0 Release 14)", Apr. 2017.

First Notification of Office Action and Search Report issued by the China National Intellectual Property Adminislation for corresponding Chinese Patent Application No. 201680088633.X, dated Jan. 26, 2021, with an English translation.

Intel Corporation, "Signaling Details for eNB Controlled Sidelink V2V Communication", Agenda Item: 7.3.2.2 2, 3GPP TSG-RAN WG1 Meeting #84bis, R1-162364, Busan, Korea, Apr. 11-15, 2016.

LG Electronics, "Discussion on UE autonomous resource allocation mechanism for PC5-based V2V", Agenda Item: 7.3.2.2.1, 3GPP TSG-RAN WG1 Meeting #84, R1-160634, St. Julian's, Malta, Feb. 15-19, 2016.

LG Electronics Inc., "Potential enhancements for V2P", Agenda Item: 8.11.4, 3GPP TSG-RAN WG2 Meeting #94, R2-164080, Nanjing, China, May 23-27, 2016.

Second Notification of Office Action and Search Report issued by the China National Intellectual Property Administration for corresponding Chinese Patent Application No. 201680088633.X, dated Jun. 2, 2021, with an English translation.

The Third Notification of Office Action issued by the China National Intellectual Property Administration for corresponding Chinese Patent Application No. 201680088633.X, dated Sep. 15, 2021, with an English translation.

\* cited by examiner

POWER CONTROL METHOD AND APPARATUS AND COMMUNICATION SYSTEM

CROSS REFERENCE TO RELATED APPLICATIONS

This application is a continuation application of International Application PCT/CN2016/099877 filed on Sep. 23, 2016, the entire contents of which are incorporated herein by reference.

FIELD

This disclosure relates to the field of communication technologies, and in particular to a power control method and apparatus and a communication system.

BACKGROUND

Figure 1:
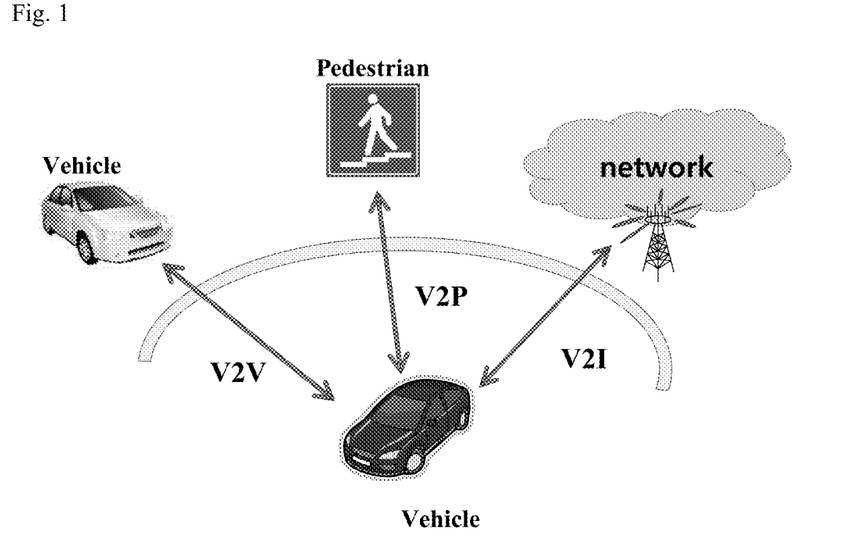
FIG. 1 is a schematic diagram of a V2X scenario.

V2X (Vehicle-to-Everything) communication includes three types, V2V (Vehicle-to-Vehicle) communication, V2I (Vehicle-to-Infrastructure) communication and V2P (Vehicle-to-Pedestrian) communication. FIG. 1 is a schematic diagram of scenarios of these three types of communication modes.

In the P2V (Pedestrian-to-Vehicle) scenario, P2V-related information may be transmitted after being authorized by an evolved UMTS terrestrial radio access network (E-UTRAN). The P2V information may include such information as a location, terminal attributes, and the like. A size of the P2V information should also be variable. Transmission of the P2V information may be in a form of direct transmission, that is, without any infrastructure, or by means of infrastructure, such as a road side unit (RSU). Sidelink communication mode is a form of direct transmission.

Figure 2:
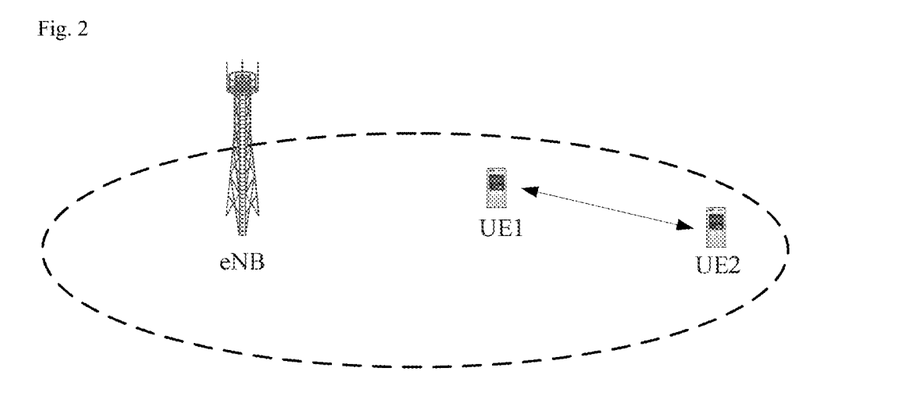
FIG. 2 is a schematic diagram of a sidelink communication scenario.
Figure 3:
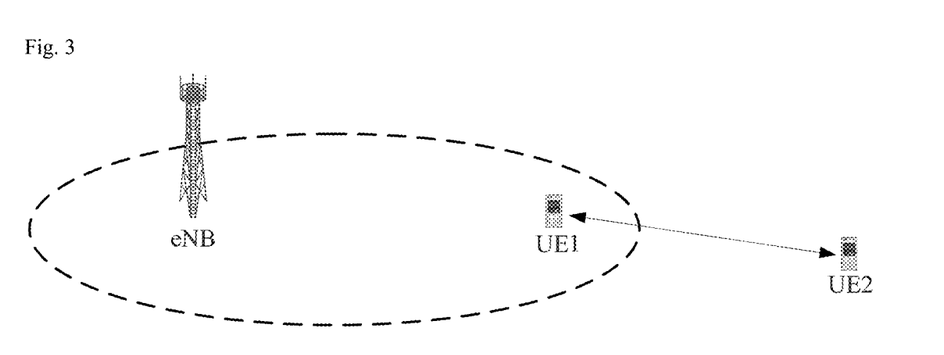
FIG. 3 is another schematic diagram of a sidelink communication scenario.
Figure 4:
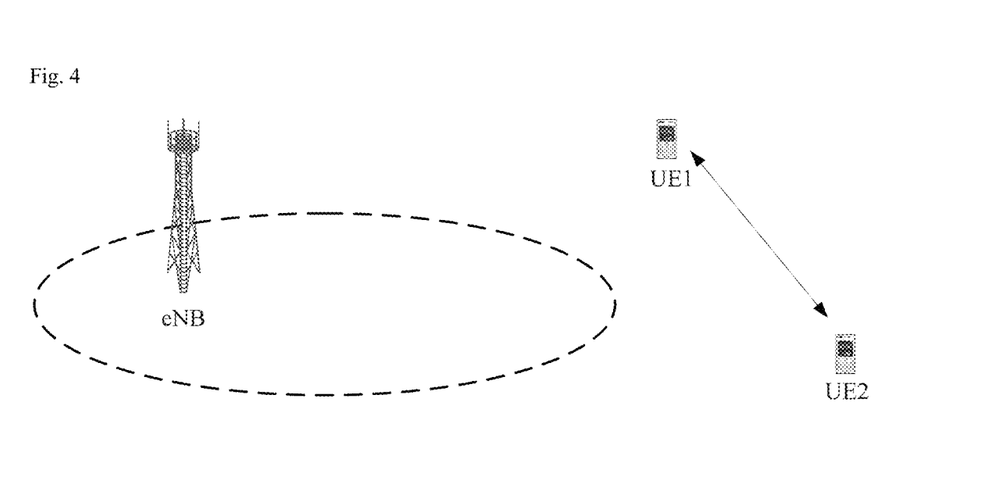
FIG. 4 is a further schematic diagram of a sidelink communication scenario.

The sidelink communication mode refers to that a packet needs not to pass a core network and a base station, and a communication link may be directly established between UE1 and UE2 for communication. A discovery process is generally performed before performing sidelink communication. For example, UE2 needs first to discover whether UE1 is near before transmitting information to UE1 via the sidelink communication mode. FIG. 2 is a schematic diagram of discovery of UEs or establishment of sidelink communication when two UEs (UE1 and UE2) are both under coverage of a base station. FIG. 3 is a schematic diagram of discovery of UEs or establishment of sidelink communication when one UE (UE1) is under coverage of a base station while another UE (UE2) is not under coverage of the base station. FIG. 4 is a schematic diagram of discovery of UEs or establishment of sidelink communication when two UEs (UE1 and UE2) are not under coverage of a base station.

Figure 5:
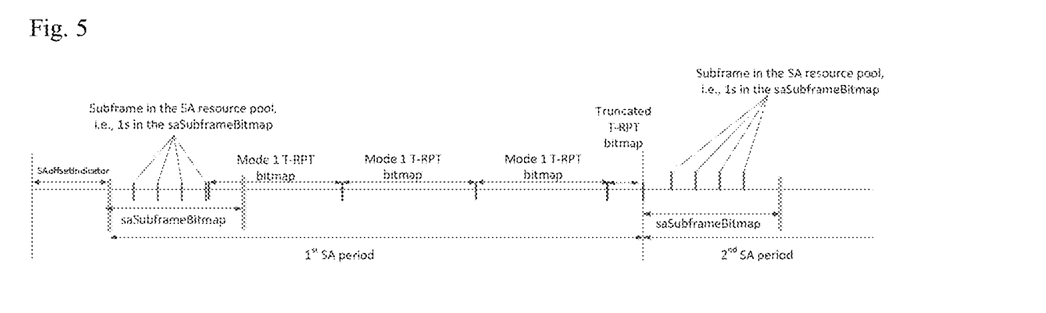
FIG. 5 is a schematic diagram of a resource pool used for sidelink direct communication.

Before performing sidelink transmission, the terminal will be configured with a resource pool. A scheduling assignment (SA) resource pool in the resource pool is used for transmitting a physical sidelink control channel (PSCCH). The PSCCH carries sidelink control information (SCI) format 0 information. And according to a current protocols, the SCI format 0 information shall be repeatedly transmitted twice in two different subframes in the SA resource pool, as shown in FIG. 5.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that for the P2V scenario, if only the direct transmission mode is available, when an application stratum triggers an access stratum (AS) to transmit P2V information, the terminal will select to transmit P2V information by using the direct transmission mode. And when the AS selects transmission power, it will set the transmission power according to the configuration of the base station.

However, for different scenarios, receiver ends of the P2V information will be at different distances from the transmitter end. For receiver ends at different distances, the transmitter end should use different transmit power. However, neither the AS of the base station nor the AS of the terminal knows the information, which will result in not capable of configuring appropriate transmission power to transmit the P2V information.

For the problem described above, embodiments of this disclosure provide a power control method and apparatus and a communication system.

According to a first aspect of the embodiments of this disclosure, there is provided a power control method, applicable to a terminal, the method including:

acquiring transmission power assistant information when the terminal is triggered to transmit sidelink information; and determining transmission power of the sidelink information according to the transmission power assistant information.

According to a second aspect of the embodiments of this disclosure, there is provided a power control method, applicable to an eNB, the method including:

receiving transmission power assistant information transmitted by a terminal;

selecting or adjusting a transmission power parameter with reference to the transmission power assistant information; and transmitting the transmission power parameter to the terminal, so that the terminal calculates transmission power of its sidelink information according to the transmission power parameter and a corresponding transmission power calculation formula.

According to a third aspect of the embodiments of this disclosure, there is provided a power control apparatus, configured in a terminal, the apparatus including:

an acquiring unit configured to acquire transmission power assistant information when the terminal is triggered to transmit sidelink information; and a determining unit configured to determine transmission power of the sidelink information according to the transmission power assistant information.

According to a fourth aspect of the embodiments of this disclosure, there is provided a power control apparatus, configured in an eNB, the apparatus including:

a receiving unit configured to receive transmission power assistant information transmitted by a terminal;

a setting unit configured to select or adjust a transmission power parameter with reference to the transmission power assistant information; and a transmitting unit configured to transmit the transmission power parameter to the terminal, so that the terminal calculates transmission power of its sidelink information according to the transmission power parameter and a corresponding transmission power calculation formula.

According to a fifth aspect of the embodiments of this disclosure, there is provided a terminal, including the apparatus described in the third aspect.

According to a sixth aspect of the embodiments of this disclosure, there is provided an eNB, including the apparatus described in the fourth aspect.

According to a seventh aspect of the embodiments of this disclosure, there is provided a communication system, including an eNB and a terminal, the terminal including the apparatus described in the third aspect, and the eNB including the apparatus described in the fourth aspect.

An advantage of the embodiments of this disclosure exists in that a characteristic that an application stratum of the terminal is able to learn a distance between a receiver end and a transmitter end according to a positioning system and/or a map is utilized, and information related on power setting is provided to an access stratum of the terminal, so as to instruct the terminal or the eNB to set appropriate transmission power.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. Such embodiments are illustrative only, and are intended to limit this disclosure.

In this disclosure, a base station may be referred to as an access point, a broadcast transmitter, a node B, or an evolution node B (eNB), etc., and may include some or all functions thereof. A term "base station" shall be used in the text, and each base station provides communication coverage for a specific geographical region.

In this disclosure, a terminal or equipment may be referred to as a user equipment (UE). The UE may be fixed or mobile, and may also be referred to as a mobile station, an access terminal, a user unit, or a station, etc. The UE may be a cellular phone, a personal digital assistant (PDA), a wireless modem, a wireless communication device, a handhold device, a lap-top computer, a cordless telephone, and a vehicle, etc.

In the discussion of 3GPP (3rd Generation Partnership Project) 36.213, settings of transmission power of a terminal are specified as follows.

For transmission power of a PSCCH, if a resource allocation mode is mode1 (reference may be made to 3GPP 36.213 for its detailed definition), that is, the base station allocates resources for the terminal as requested by the terminal, the terminal may determine the transmission power of the PSCCH according to a value of a transmitter power control (TPC) command in downlink control information (DCI) transmitted by the base station. For example, if the TPC command in the DCI is 0, the terminal may determine the transmission power of its PSCCH according to formula (1); and if the TPC command in the DCI is 1, the terminal may determine the transmission power of its PSCCH according to formula (2). And if the resource allocation mode is mode2 (reference may be made to 3GPP 36.213 for its detailed definition), that is, the base station configures a resource pool for the terminal and the terminal selects a resource from the resource pool, the terminal may determine the transmission power of its PSCCH according to formula (3).

$$P_{PSCCH} = P_{CMAX,PSCCH} \quad (1),$$

$$P_{PSCCH} = \min\{P_{CMAX,PSCCH}, 10 \log_{10}(M_{PSCCH}) + P_{0\_PSCCH,1} + \alpha_{PSCCH,1} \cdot PL\}[dBm] \quad (2),$$

$$P_{PSCCH} = \min\{P_{CMAX,PSCCH}, 10 \log_{10}(M_{PSCCH}) + P_{0\_PSCCH,2} + \alpha_{PSCCH,2} \cdot PL\}[dBm] \quad (3),$$

In the above formulae, $P_{CMAX,PSCCH}$ is the transmission power on the PSCCH configured by a higher layer and reference may be made to 3GPP 36.101 for its detailed meaning; $M_{PSCCH}$ is a bandwidth of the PSCCH, and $M_{PSCCH}=1$, $PL=PL_c$, $PL_c$ being an estimated value of a loss of a downlink path from the terminal to a serving cell c, and reference being able to be made to 5.1.1.1 in 3GPP 36.213 for its detailed meaning; $P_{0\_PSCCH,1}$ is a $P_0$ value (a power parameter) of the PSCCH in mode 1 configured by the higher layer; $\alpha_{PSCCH,1}$ is an alpha value of the PSCCH in mode 1 configured by the higher layer; $P_{0\_PSCCH,2}$ is a $P_0$ value (a power parameter) of the PSCCH in mode 2 configured by the higher layer; and $\alpha_{PSCCH,2}$ is an alpha value of the PSCCH in mode 2 configured by the higher layer.

For transmission power of a physical sidelink shared channel (PSSCH), the case is similar to the PSCCH, and if the resource allocation mode is mode 1, the terminal may determine the transmission power of the PSSCH according to the value of the TPC command in the DCI transmitted by the base station. For example, if the TPC command in the DCI is 0, the terminal may determine transmission power of its PSSCH according to formula (4); and if the TPC command in the DCI is 1, the terminal may determine the transmission power of its PSSCH according to formula (5). And if the resource allocation mode is mode 2, the terminal may determine the transmission power of its PSSCH according to formula (6).

$$P_{PSCCH} = P_{CMAX,PSCCH} \quad (4),$$

$$P_{PSCCH} = \min\{P_{CMAX,PSCCH}, 10 \log_{10}(M_{PSCCH}) + P_{0\_PSCCH,1} + \alpha_{PSCCH,1} \cdot PL\}[dBm] \quad (5);$$

$$P_{PSCCH} = \min\{P_{CMAX,PSCCH}, 10 \log_{10}(M_{PSCCH}) + P_{0\_PSCCH,2} + \alpha_{PSCCH,2} \cdot PL\}[dBm] \quad (6);$$

In the above formulae, $P_{CMAX,PSSCH}$ is the transmission power on the PSSCH configured by a higher layer and reference may be made to 3GPP 36.101 for its detailed meaning; $M_{PSSCH}$ is a bandwidth of the PSSCH, and $PL=PL_c$, $PL_c$ being an estimated value of a loss of a downlink path from the terminal to a serving cell c, and reference being able to be made to 5.1.1.1 in 3GPP 36.213 for its detailed meaning; $P_{0\_PSSCH,1}$ is a $P_0$ value (a power parameter) of the PSSCH in mode 1 configured by the higher layer, which is configured by the higher layer; $\alpha_{PSSCH,1}$ is an alpha value of the PSSCH in mode 1 configured by the higher layer, which is configured by the higher layer; $P_{0\_PSSCH,2}$ is a $P_0$ value (a power parameter) of the PSSCH in mode 2 configured by the higher layer; and $\alpha_{PSSCH,2}$ is an alpha value of the PSSCH in mode 2 configured by the higher layer.

The embodiments of this disclosure shall be described below with reference to the accompanying drawings.

Embodiment 1

Figure 6:
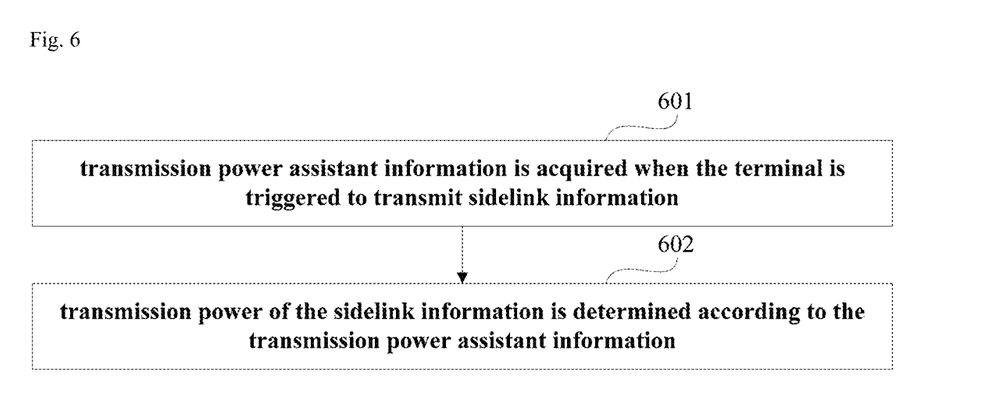
FIG. 6 is a schematic diagram of the power control method of Embodiment 1.

This embodiment provides a power control method, applicable to a terminal. FIG. 6 is a schematic diagram of the method. As shown in FIG. 6, the method includes:

step 601: transmission power assistant information is acquired when the terminal is triggered to transmit sidelink information; and step 602: transmission power of the sidelink information is determined according to the transmission power assistant information.

In this embodiment, an application stratum of the terminal may trigger an access stratum to transmit sidelink information, such as the above-described P2V information. In addition, the application stratum may provide the transmission power assistant information to the access stratum according to a position of a receiver end to assist the terminal or the base station in setting appropriate transmission power.

In this embodiment, since the application stratum of the terminal may learn a distance between the receiver end and the transmitter end according to a positioning system and/or a map, when the application stratum of the terminal triggers the access stratum to transmit the sidelink information, the application stratum may further transmit information related on power setting to the access stratum, so that the access stratum or the base station sets appropriate transmission power with reference to the information.

In this embodiment, the terminal is, for example, a mobile device held by a pedestrian in the scenario shown in FIG. 1, and the receiver end is, for example, a vehicle in the scenario in FIG. 1. In addition, the terminal and the receiver end may respectively be UE1 and UE2 in the scenario in FIGS. 2-4, etc.

In this embodiment, the base station may be macro base station (such as an eNB), and a macro cell generated by the macro base station may provide services for the terminal; or the base station of the embodiment of this disclosure may also be a pico base station, and a pico cell generated by the pico base station may provide services for the terminal. However, this disclosure is not limited thereto, and a particular scenario may be determined as actually demanded.

In this embodiment, the transmission power assistant information may be information on a distance between a receiver end receiving the sidelink information and a transmitter end (the above terminal), or information on a position of a receiver end receiving the sidelink information, or power level indication information, such as information indicating high power, normal power, and low power.

With the method of this embodiment, the terminal may transmit the sidelink information with appropriate transmission power.

In this embodiment, for the terminal in the coverage of the base station, the base station may also indicate, via broadcast information, which interfaces the terminal may use to transmit the sidelink information, such as by using a PC5 interface, or by using a UU interface. Moreover, it is likely that the base station may further configure a sidelink resource pool for the terminal via the broadcast information, so that the terminal selects resources from the resource pool to transmit sidelink information. Furthermore, as the base station configures the sidelink resource pool for the terminal via the broadcast information, the base station may further configure a transmission power parameter via the broadcast information, such as the above-described 1-bit TPC command value (0 or 1) and/or $P_{O\_PSCCH,1}$, $\alpha_{PSCCH,1}$ and/or $P_{O\_PSSCH,1}$, $\alpha_{PSSCH,1}$, or $P_{O\_PSCCH,2}$, $\alpha_{PSCCH,2}$ and/or $P_{O\_PSSCH,2}$, $\alpha_{PSSCH,2}$. The transmission power parameter may be transmitted via an SL-TxParameters IE in the broadcast information.

In one implementation of this embodiment, for the terminal in the coverage of the base station, after obtaining the above transmission power assistant information provided by the application stratum, the terminal does not provide the transmission power assistant information to the base station, but adjusts its transmission power by itself.

In this implementation, the terminal may first calculate the transmission power of its sidelink information according to the transmission power parameter configured by the base station and corresponding transmission power calculation formulae (such as formulae 1-6 described above), and then adjust the transmission power of its sidelink information with reference to the transmission power assistant information.

In this implementation, reference may be made to the above description for the manner in which the terminal calculates the transmission power of its sidelink information, which shall not be described herein any further.

In this implementation, the base station may preconfigure a power adjustment range, and the terminal may adjust its transmission power within the range according to the above transmission power assistant information. For example, the power adjustment range may be 0, that is, no adjustment is performed. Furthermore, the power adjustment range may also be preset, for example, such as being set ex works. This embodiment is not limited thereto, and when the terminal adjusts its transmission power, it may also make reference to other factors, or perform adjustment by itself according to other policies.

In another implementation of this embodiment, for the terminal in the coverage of the base station, after obtaining the above transmission power assistant information provided by the application stratum, the terminal may provide the transmission power assistant information to the base station, and the transmission power of its sidelink information may be adjusted by the base station.

In this implementation, the terminal may transmit the transmission power assistant information to the base station, receive a transmission power parameter (as described above) selected or adjusted by the base station according to the transmission power assistant information, and calculate the transmission power of its sidelink information according to the selected or adjusted transmission power parameter and the corresponding transmission power calculation formulae (such as formulae 1-6 described above)

In this implementation, the terminal may transmit the transmission power assistant information to the base station via a sidelinkUEInformation IE; however, this embodiment is not limited thereto. In this implementation, reference may be made to the above description for the manner in which the terminal calculates the transmission power of its sidelink information, which shall not be described herein any further.

In this implementation, if the base station configures resources for the terminal in mode 1, the terminal transmits the sidelinkUEInformation IE to request the base station for a sidelink resource. At this moment of time, the terminal may simultaneously transmit the above transmission power assistant information to the base station via the IE, and the base station may schedule a PSCCH resource and/or a PSSCH resources regarding the sidelink information via a PDCCH, and indicate transmission power of the PSCCH and the PSSCH by using 1 bit in the DCI. Moreover, the base station may, according to the transmission power assistant information transmitted by the terminal, select or adjust the above-described transmission power parameter, such as the 1-bit TPC command value (0 or 1) of the PSCCH and/or the PSSCH used for the sidelink information, and the transmission power parameters used for calculating the transmission power, such as $P_{0\_PSCCH,1}$ and $\alpha_{PSCCH,1}$ in formula 2 and/or $P_{0\_PSSCH,1}$ and $\alpha_{PSSCH,1}$ in formula 5, so that the terminal calculates its transmission power according to the parameters and formula 1 and/or formula 4, or according to formula 2 and/or formula 5.

In this implementation, if the base station configures the resource pool for the terminal in mode 2, after the terminal notifies the base station via the sidelinkUEInformation IE of the above transmission power assistant information, the base station may, according to the transmission power assistant information provided by the terminal, adjust the above-described transmission power parameter, such as the transmission power parameters used for calculating the transmission power, such as $P_{0\_PSCCH,2}$ and $\alpha_{PSCCH,2}$ in formula 3 and/or $P_{0\_PSSCH,2}$ and $\alpha_{PSSCH,2}$ in formula 6, so that the terminal calculates its transmission power according to the parameters and formula 3 and/or formula 6.

In a further implementation of this embodiment, for a terminal outside the coverage of the base station, since no base station provides a service for the terminal, the terminal may adjust transmission power of its sidelink transmission by itself after obtaining the above transmission power assistant information provided by the application stratum.

In this implementation, the terminal may adjust preconfigured transmission power of the sidelink information with reference to the transmission power assistant information.

In this implementation, since the terminal has left the coverage of the base station and no longer receives information transmitted by the base station, it may adjust the transmission power of the sidelink information with reference to the above transmission power assistant information. The transmission power of the sidelink information is preconfigured, such as being configured ex works. Moreover, a power adjustment range may be preset, such as being preset ex works. Hence, the terminal may adjust its transmission power according to the above transmission power assistant information within the range. For example, the power adjustment range may be 0, that is, no adjustment is performed. Furthermore, as to a power adjustment mode, this embodiment is not limited thereto, and when the terminal adjusts its transmission power, it may also make reference to other factors, or perform adjustment by itself according to other policies.

With the method of this embodiment, a characteristic that an application stratum of the terminal is able to learn a distance between a receiver end and a transmitter end according to a positioning system and/or a map is utilized, and information related on power setting is provided to an access stratum of the terminal, so as to instruct the terminal or the base station to set appropriate transmission power.

Embodiment 2

This embodiment provides a power control method, applicable to a base station. This method is process at a base station side corresponding to the method of Embodiment 1, with contents identical to those in Embodiment 1 being not going to be described herein any further.

Figure 7:
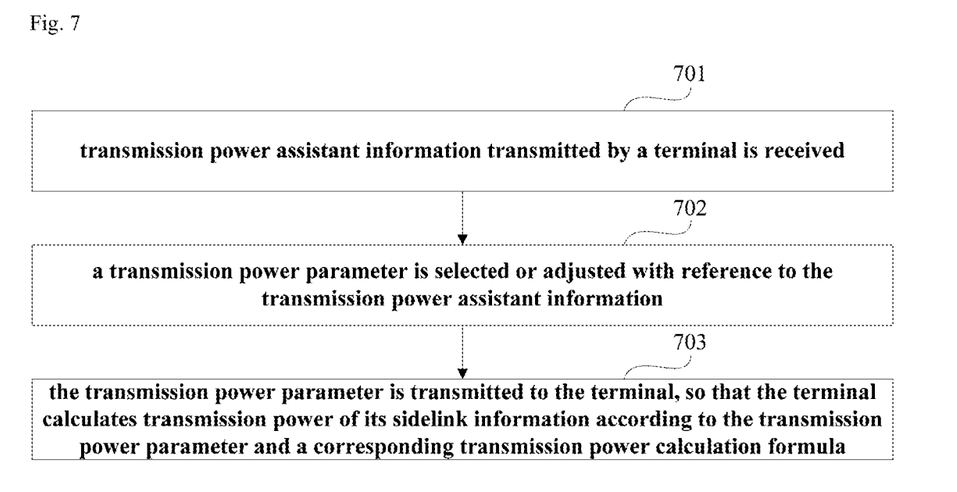
FIG. 7 is a schematic diagram of the power control method of Embodiment 2.

FIG. 7 is a flowchart of the method of this embodiment. As shown in FIG. 7, the method includes:

step 701: transmission power assistant information transmitted by a terminal is received;

step 702: a transmission power parameter is selected or adjusted with reference to the transmission power assistant information; and step 703: the transmission power parameter is transmitted to the terminal, so that the terminal calculates transmission power of its sidelink information according to the transmission power parameter and a corresponding transmission power calculation formula.

In this embodiment, the transmission power assistant information may be information on a distance between a receiver end receiving the sidelink information and a transmitter end (the above terminal), or information on a position of a receiver end receiving the sidelink information, or power level indication information, with details being as those described above, which shall not be described herein any further.

In this embodiment, the transmission power parameter may be, for example, a 1-bit TPC command value (0 or 1) and/or $P_{O\_PSCCH,1}$, $\alpha_{PSCCH,1}$ and/or $P_{O\_PSSCH,1}$, $\alpha_{PSSCH,1}$, or $P_{O\_PSCCH,2}$, $\alpha_{PSCCH,2}$ and/or $P_{O\_PSSCH,2}$, $\alpha_{PSSCH,2}$, with details being as those described above, which shall not be described herein any further.

With the method of this embodiment, a characteristic that an application stratum of the terminal is able to learn a distance between a receiver end and a transmitter end according to a positioning system and/or a map is utilized, and information related on power setting is provided to an access stratum of the terminal, so as to instruct the terminal or the base station to set appropriate transmission power.

Embodiment 3

This embodiment provides a power control apparatus, configured in a terminal. As principles of the apparatus for solving problems are similar to that of the method in Embodiment 1, the implementation of the method in Embodiment 1 may be referred to for implementation of the apparatus, with identical contents being not going to be described herein any further.

Figure 8:
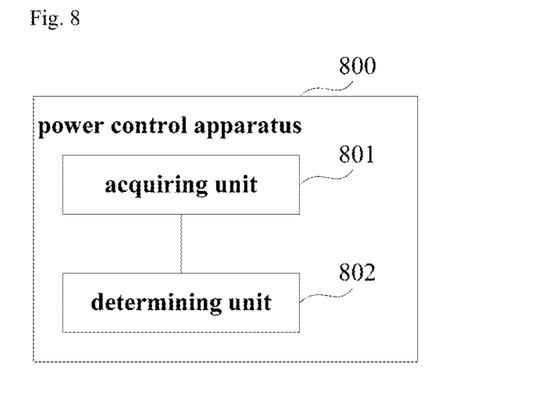
FIG. 8 is a schematic diagram of the power control apparatus of Embodiment 3.

FIG. 8 is a schematic diagram of the power control apparatus of this embodiment. As shown in FIG. 8, a power control apparatus 800 includes an acquiring unit 801 and a determining unit 802. The acquiring unit 801 is configured to acquire transmission power assistant information when the terminal is triggered to transmit sidelink information and the determining unit 802 is configured to determine transmission power of the sidelink information according to the transmission power assistant information.

In this embodiment, the transmission power assistant information is: information on a distance between a receiver end receiving the sidelink information and a transmitter end, or information on a position of a receiver end receiving the sidelink information, or power level indication information.

In this embodiment, the acquiring unit 801 acquires the transmission power assistant information from an application stratum of the terminal.

Figure 9:
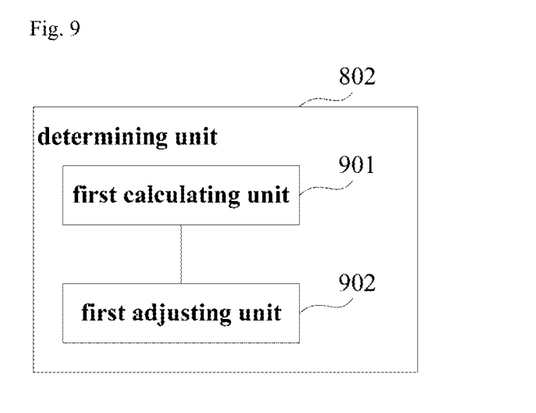
FIG. 9 is a schematic diagram of an implementation of the determining unit in the power control apparatus of Embodiment 3.

In one implementation of this embodiment, as shown in FIG. 9, the determining unit 802 includes: a first calculating unit 901 and a first adjusting unit 902. The first calculating unit 901 is configured to calculate the transmission power of the sidelink information according to a transmission power parameter configured by a base station and a corresponding transmission power calculation formula, and the first adjusting unit 902 is configured to adjust the transmission power of the sidelink information with reference to the transmission power assistant information according to a power adjustment range configured by the base station.

Figure 10:
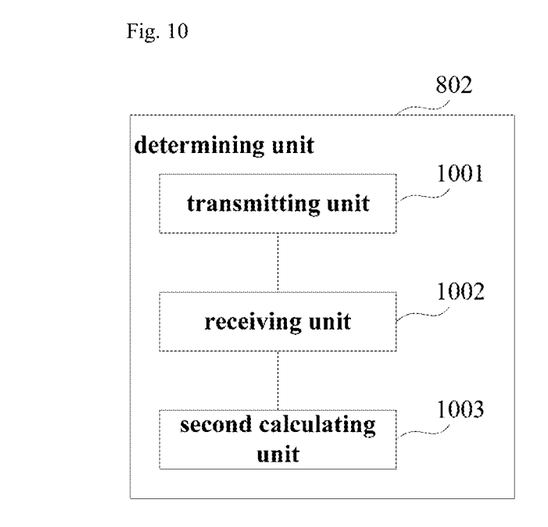
FIG. 10 is a schematic diagram of another implementation of the determining unit in the power control apparatus of Embodiment 3.

In another implementation of this embodiment, as shown in FIG. 10, the determining unit 802 includes: a transmitting unit 1001, a receiving unit 1002 and a second calculating unit 1003. The transmitting unit 1001 is configured to transmit the transmission power assistant information to the base station, the receiving unit 1002 is configured to receive a transmission power parameter selected or adjusted by the base station according to the transmission power assistant information, and the second calculating unit 1003 is configured to calculate the transmission power of the sidelink information according to the selected or adjusted transmission power parameter and a corresponding transmission power calculation formula.

Figure 11:
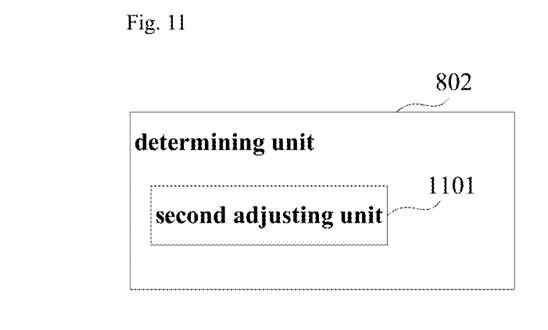
FIG. 11 is a schematic diagram of a further implementation of the determining unit in the power control apparatus of Embodiment 3.

In a further implementation of this embodiment, as shown in FIG. 11, the determining unit 802 includes: a second adjusting unit 1101. The second adjusting unit 1101 is configured to adjust preconfigured transmission power of the sidelink information with reference to the transmission power assistant information according to a preconfigured power adjustment range.

With the apparatus of this embodiment, the terminal or the base station may be instructed to set appropriate transmission power.

This embodiment further provides a terminal, configured with the power control apparatus 800 as described above.

Figure 12:
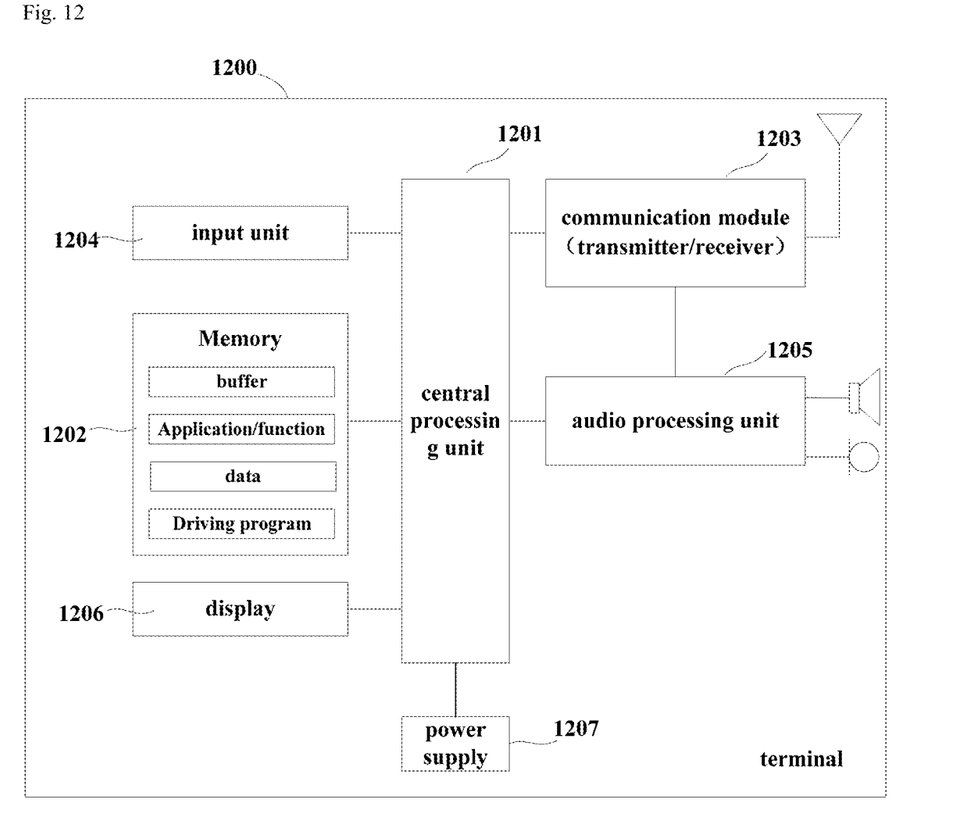
FIG. 12 is a schematic diagram of the terminal of Embodiment 3.

FIG. 12 is a schematic diagram of a structure of the terminal 12 of the embodiment of this disclosure. As shown in FIG. 12, a terminal 1200 may include a central processing unit 1201 and a memory 1202, the memory 1202 being coupled to the central processing unit 1201. It should be noted that this figure is illustrative only, and other types of structures may also be used, so as to supplement or replace this structure and achieve a telecommunications function or other functions.

In one implementation, the functions of the power control apparatus 800 may be integrated into the central processing unit 1201. The central processing unit 1201 may be configured to carry out the power control method as described in Embodiment 1.

For example, the central processing unit 1201 may be configured to perform the following control: acquiring transmission power assistant information when transmission of sidelink information is triggered; and determining transmission power of the sidelink information according to the transmission power assistant information.

In another implementation, the power control apparatus 800 and the central processing unit 1201 may be configured separately. For example, the power control apparatus 800 may be configured as a chip connected to the central processing unit 1201, with its functions being realized under control of the central processing unit 1201.

As shown in FIG. 12, the terminal 1200 may further include a communication module 1203, an input unit 1204, an audio processing unit 1205, a display 1206, and a power supply 1207. It should be noted that the terminal 1200 does not necessarily include all the parts shown in FIG. 12, and furthermore, the terminal 1200 may include parts not shown in FIG. 12, and the related art may be referred to.

As shown in FIG. 12, the central processing unit 1201 is sometimes referred to as a controller or control, which may include a microprocessor or other processor devices and/or logic devices, and the central processing unit 1201 receives input and controls operations of every component of the terminal 1200.

The memory 1202 may be, for example, one or more of a buffer memory, a flash memory, a hard drive, a mobile medium, a volatile memory, a nonvolatile memory, or other suitable devices, which may store various information, such as the transmission power assistance information, the transmission power parameters, and the transmission power calculation formula, and furthermore, store programs executing related information. And the central processing unit 1201 may execute programs stored in the memory 1202, so as to realize information storage or processing, etc. Functions of other parts are similar to those of the related art, which shall not be described herein any further. The parts of the terminal 1200 may be realized by specific hardware, firmware, software, or any combination thereof, without departing from the scope of the present disclosure.

With the terminal of this embodiment, the terminal or the base station may be instructed to set appropriate transmission power.

Embodiment 4

This embodiment provides a power control apparatus, configured in a base station. As principles of the apparatus for solving problems are similar to that of the method in Embodiment 2, the implementation of the method in Embodiment 2 may be referred to for implementation of the apparatus, with identical contents being not going to be described herein any further.

Figure 13:
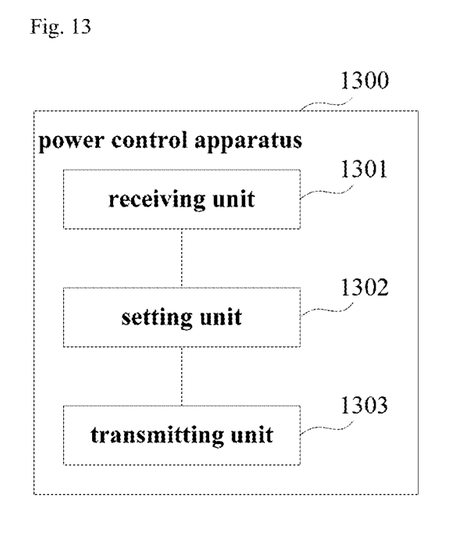
FIG. 13 is a schematic diagram of the power control apparatus of Embodiment 4.

FIG. 13 is a schematic diagram of the power control apparatus of this embodiment. As shown in FIG. 13, a power control apparatus 1300 includes a receiving unit 1301, a setting unit 1302 and a transmitting unit 1303. The receiving unit 1301 is configured to receive transmission power assistant information transmitted by a terminal, the setting unit 1302 is configured to select or adjust a transmission power parameter with reference to the transmission power assistant information, and the transmitting unit 1303 is configured to transmit the transmission power parameter to the terminal, so that the terminal calculates transmission power of its sidelink information according to the transmission power parameter and a corresponding transmission power calculation formula.

In this embodiment, the transmission power assistant information is: information on a distance between a receiver end receiving the sidelink information and a transmitter end, or information on a position of a receiver end receiving the sidelink information, or power level indication information.

With the apparatus of this embodiment, the terminal may set appropriate transmission power. This embodiment further provides a base station, configured with the power control apparatus 1300 as described above.

Figure 14:
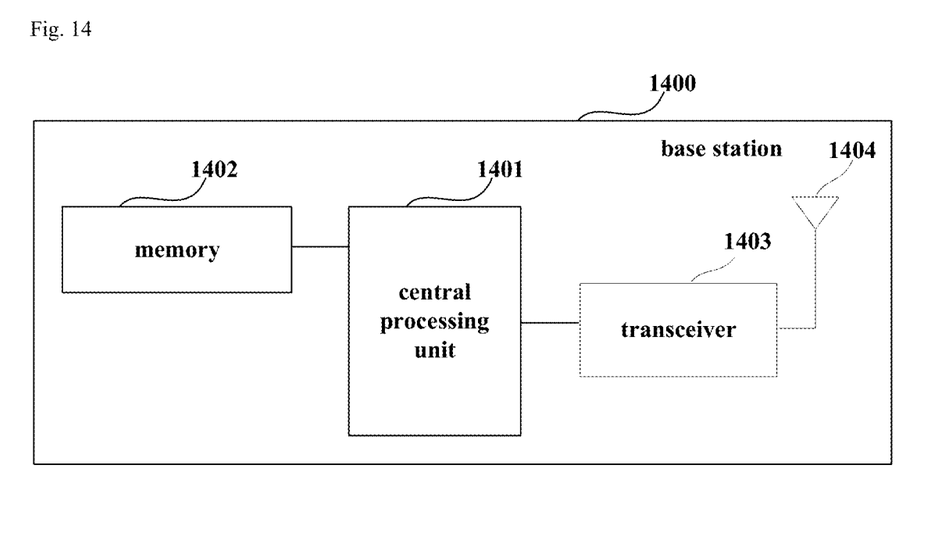
FIG. 14 is a schematic diagram of the base station of Embodiment 4.

FIG. 14 is a schematic diagram of a structure of the base station of the embodiment of this disclosure. As shown in FIG. 14, a base station 1400 may include a central processing unit (CPU) 1401 and a memory 1402, the memory 1402 being coupled to the central processing unit 1401. The memory 1402 may store various data, and furthermore, it may store a program for information processing, and execute the program under control of the central processing unit 1401, so as to receive various information transmitted by the user equipment, and transmit various information to the user equipment.

In one implementation, the functions of the power control apparatus 1300 may be integrated into the central processing unit 1401. The central processing unit 1401 may be configured to carry out the power control method as described in Embodiment 2.

For example, the central processing unit 1401 may be configured to: receive transmission power assistant information transmitted by a terminal; select or adjust a transmission power parameter with reference to the transmission power assistant information; and transmit the transmission power parameter to the terminal, so that the terminal calculates transmission power of its sidelink information according to the transmission power parameter and a corresponding transmission power calculation formula.

In another implementation, the power control apparatus 1300 and the central processing unit 1401 may be configured separately. For example, the power control apparatus 1300 may be configured as a chip connected to the central processing unit 1401, with its functions being realized under control of the central processing unit 1401.

Furthermore, as shown in FIG. 14, the base station 1400 may include a transceiver 1403, and an antenna 1404, etc. Functions of the above components are similar to those in the related art, and shall not be described herein any further. It should be noted that the base station 1400 does not necessarily include all the parts shown in FIG. 14, and furthermore, the base station 1400 may include parts not shown in FIG. 14, and the related art may be referred to.

With the base station of this embodiment, the terminal may set appropriate transmission power.

Embodiment 5

This embodiment provides a communication system, including a base station and a terminal.

Figure 15:
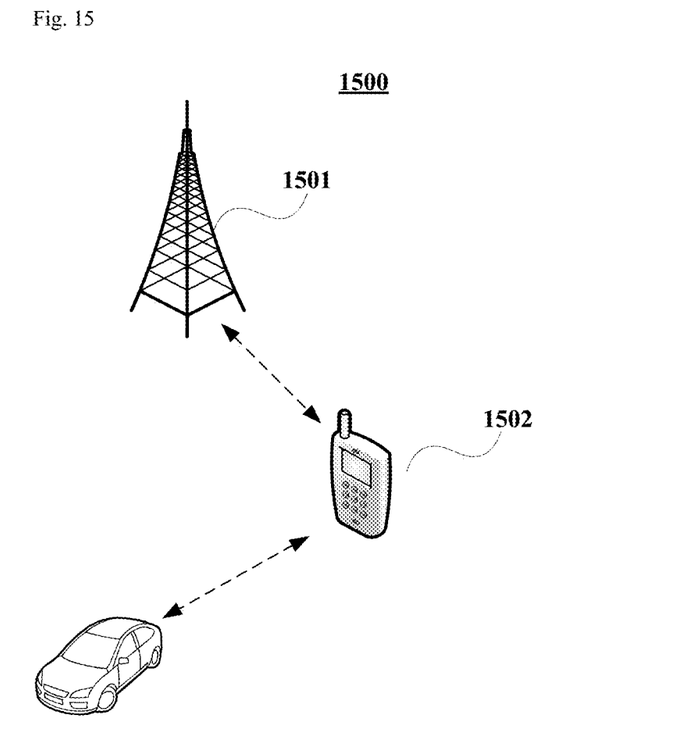
FIG. 15 is a schematic diagram of the communication system of Embodiment 5.

FIG. 15 is a schematic diagram of the communication system of the embodiment of this disclosure. As shown in FIG. 15, a communication system 1500 includes a base station 1501 and a terminal 1502. The base station 1501 may be the base station 1400 in Embodiment 4, and the terminal 1502 may be the terminal 1200 in Embodiment 3.

In this embodiment, description is given by taking a vehicle as a receiver end as an example; however, this embodiment is not limited thereto.

As the terminal 1200 and the base station 1400 have been described above in detail, the contents of them are incorporated herein, and shall not be described herein any further.

With the communication system of this embodiment, a characteristic that an application stratum of the terminal is able to learn a distance between a receiver end and a transmitter end according to a positioning system and/or a map is utilized, and information related on power setting is provided to an access stratum of the terminal, so as to instruct the terminal or the base station to set appropriate transmission power.

An embodiment of the present disclosure provides a computer readable program, which, when executed in a power control apparatus or a terminal, will cause the power control apparatus or the terminal to carry out the power control method as described in Embodiment 1.

An embodiment of the present disclosure provides a computer storage medium, including a computer readable program, which will cause a power control apparatus or a terminal to carry out the power control method as described in Embodiment 1.

An embodiment of the present disclosure provides a computer readable program, which, when executed in a power control apparatus or a base station, will cause the power control apparatus or the base station carry out the power control method as described in Embodiment 2.

An embodiment of the present disclosure provides a computer storage medium, including a computer readable program, which will cause a power control apparatus or a base station to carry out the power control method as described in Embodiment 2.

The above apparatuses and method of this disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The power control methods carried out in the power control apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 8 or 13 may either correspond to software modules of procedures of a computer program, or correspond to hardware modules. Such software modules may respectively correspond to the steps shown in FIG. 6 or 7. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 8 or 13 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 8 or 13 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A power control apparatus, configured in a terminal, the apparatus comprising:
a memory that stores a plurality of instructions;
processor circuitry that couples to the memory and is configured to execute the plurality of instructions to:
acquire transmission power assistant information when the terminal is triggered to transmit sidelink information by an application stratum of the terminal; and
determine transmission power of the sidelink information according to the transmission power assistant information without assistance of an eNB,
wherein the transmission power assistant information is:
power level indication information between a receiver end receiving the sidelink information and a transmitter end,
wherein the processor circuitry is further configured to:
adjust preset transmission power of the sidelink information with reference to the power level indication information according to a preconfigured power adjustment range and not report the power level indication information to the eNB, and
wherein zero is included in the preconfigured power adjustment range of the transmission power.

2. The apparatus according to claim 1, wherein the processor circuitry is further configured to acquire the transmission power assistant information from an application stratum of the terminal.

* * * * *